United States Patent [19]

Agee

[11] Patent Number: 4,601,632
[45] Date of Patent: Jul. 22, 1986

[54] STOWABLE TRUCK RAMP WITH EXTENSION SLEEVE

[76] Inventor: John H. Agee, R.R. 2, Fremont, Nebr. 68025

[21] Appl. No.: 679,988

[22] Filed: Dec. 10, 1984

[51] Int. Cl.⁴ .......................................... B65G 67/02
[52] U.S. Cl. .................................... 414/537; 14/71.1; 296/61
[58] Field of Search ............... 414/537, 538, 397, 571, 414/529, 532; 193/35 TE, 6, 38, 40; 14/2.4, 71.1, 71.3, 69.5; 296/51, 58, 61; 410/6

[56] References Cited

U.S. PATENT DOCUMENTS

| | | | |
|---|---|---|---|
| 1,699,882 | 1/1929 | Ferguson | 414/537 |
| 3,270,899 | 9/1966 | Brown et al. | 414/718 X |
| 3,511,393 | 5/1970 | Abromavage. | |
| 3,596,788 | 8/1971 | Willie | 414/718 X |
| 3,613,920 | 10/1971 | Flamm. | |
| 3,711,882 | 1/1973 | Iller. | |
| 3,768,673 | 10/1973 | Nydam et al. | 414/537 X |
| 3,870,170 | 3/1975 | Noble et al. | 14/69.5 X |
| 3,977,545 | 8/1976 | Lloyd | 414/537 |
| 4,380,415 | 4/1983 | Higginson et al. | 414/537 |
| 4,455,119 | 6/1984 | Smith | 414/537 |

Primary Examiner—Frank E. Werner
Attorney, Agent, or Firm—Zarley, McKee, Thomte, Voorhees & Sease

[57] ABSTRACT

A stowable ramp assembly for a pickup truck or the like includes a generally thin, flat and elongated ramp sleeve adapted for placement on a truck bed with the rearward end thereof positioned at the rearward end of the bed. An extension sleeve is telescopically slidable within the ramp sleeve and an elongated ramp is telescopically slidably received in the extension sleeve. The extension sleeve is rearwardly slidable to a working position over the lowered horizontal tailgate and the ramp is extendable rearwardly therefrom in the working position and connected to the extension sleeve for up and down pivotal movement of the rearward end of the ramp.

5 Claims, 5 Drawing Figures

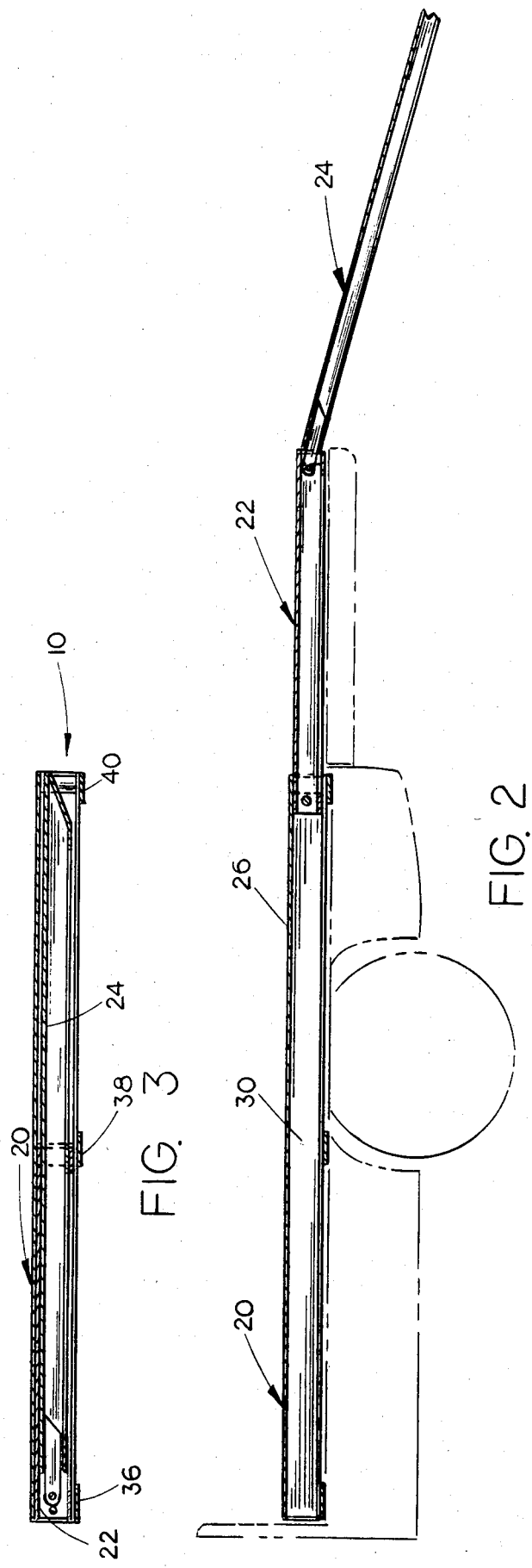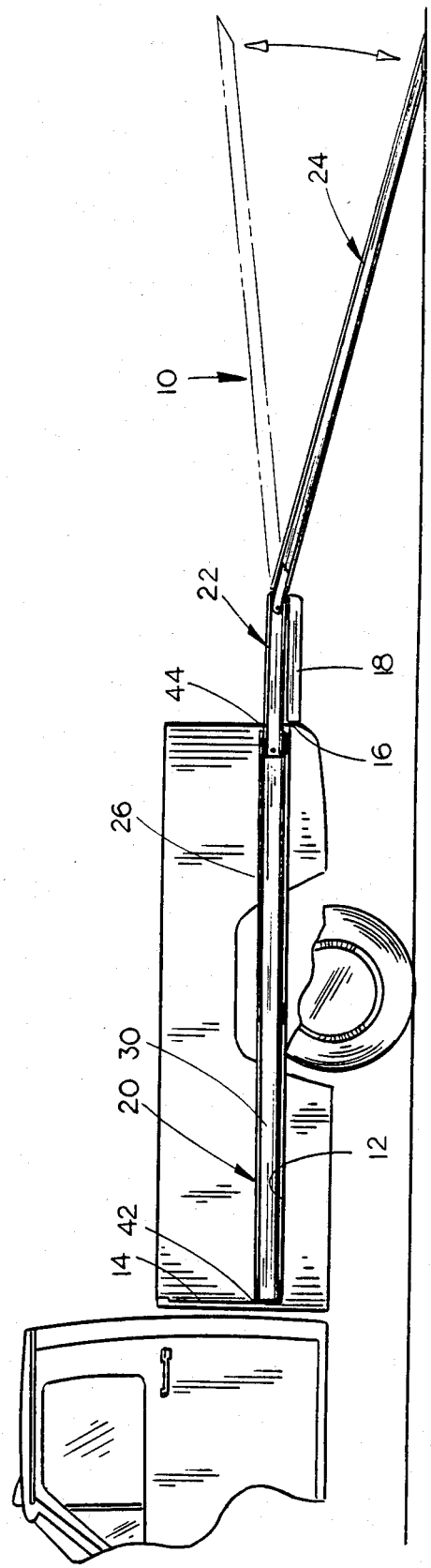

STOWABLE TRUCK RAMP WITH EXTENSION SLEEVE

BACKGROUND OF THE INVENTION

The present invention is directed generally to a ramp for loading and unloading objects to and from a pickup truck bed, for example, and more particularly to a ramp which is adapted to be stowed in the truck bed below the load thereon and which is operative with the tailgate of the truck in its rearwardly extended horizontal position.

The loading and unloading of heavy objects onto a raised surface such as a truck bed is made easier by providing an inclined ramp. Storage of conventional ramps on a truck bed may be difficult, however, after a large load has been placed on the truck bed. Accordingly, ramps have been devised which can be slidably moved onto the truck bed below a raised support surface. To accommodate pickup trucks having tailgates, however, one known ramp is hinged at a position registered with the end of the tailgate. The resulting reduction in the length of the inclined portion of the ramp reduces the effectiveness of the ramp by providing a steeper angle for loading.

Another problem associated with known ramps is the transfer of excessive loads onto the lowered tailgate of a truck and also the substantial size and weight of the ramps which makes handling and operation of the ramps difficult for some and impossible for others.

Accordingly, a primary object of the invention is to provide an improved stowable ramp assembly for pickup trucks and the like.

Another object is to provide a stowable ramp assembly including a rigid ramp substantially as long as the truck bed and yet which is operable with the tailgate of the truck in a lowered horizontal position.

Another object is to provide a stowable ramp assembly wherein loads applied to the ramp at a position above the tailgate are partially transferred to the bed of the truck.

Another object is to provide a stowable ramp assembly which is of reduced size and weight for easy handling yet which may be used in conjunction with one or more additional assemblies in side-by-side relation for loading and supporting even very large loads.

Finally, an object of the invention is to provide a stowable ramp assembly which is simple and rugged in construction, economical to manufacture and efficient in operation.

SUMMARY OF THE INVENTION

The stowable ramp assembly of the present invention includes a thin, flat and elongated ramp sleeve adapted for placement on a truck bed with the rearward end thereof positioned at the rearward end of the bed. An extension sleeve is telescopically slidably received in the ramp sleeve for fore and aft sliding movement between a storage position substantially within the ramp sleeve and a working position extended rearwardly of the ramp sleeve by a dimension of at least the rearward extent of the tailgate from the bed of the truck in the horizontal position of the tailgate.

Finally, an elongated ramp is telescopically slidably received in the extension sleeve for fore and aft sliding movement through the extension sleeve and into and from the ramp sleeve for movement between a storage position substantially entirely within the ramp sleeve and an extending working position with the forward end of the ramp situated adjacent the rearward end of the extension sleeve in the working position thereof.

The ramp is substantially as long as the ramp sleeve which, in turn, is substantially as long as the truck bed, so as to afford the smallest angle of incline possible for a ramp of a length capable of being stored on the truck bed. Various coacting stop means are provided on the ramp and sleeves for limiting rearward sliding movement of the extension sleeve and ramp to their working positions.

Whereas the extension sleeve, in its working position, overlies the lowered tailgate, the telescopic connection of the extension sleeve to the ramp sleeve effectively results in load transfer to the bed of the trucks, thereby to reduce loads and stress on the lowered tailgate.

BRIEF DESCRIPTION OF THE DRAWINGS

FIG. 1 is a partial side view of the ramp, in its extended position, on a truck with parts of the truck broken away for clarity;

FIG. 2 is an enlarged side sectional view of the ramp in its extended position;

FIG. 3 is an enlarged side sectional view of the ramp in its collapsed position;

DESCRIPTION OF THE PREFERRED EMBODIMENTS

Figure 4:
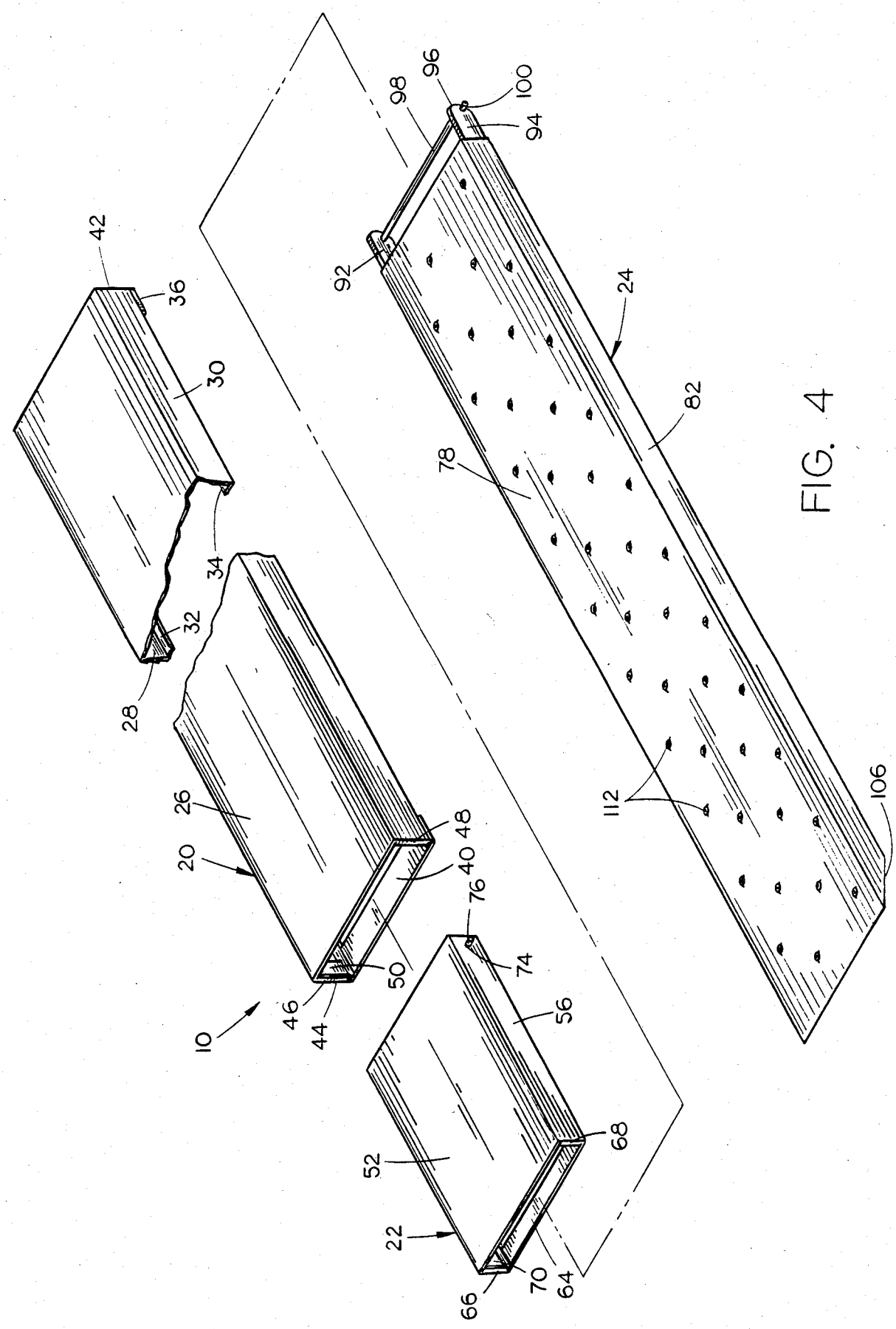
FIG. 4 is an exploded perspective view of the ramp assembly of the invention.

The stowable ramp assembly 10 of the present invention is shown in FIGS. 1–3 in position on a pickup truck bed 12 against the front wall 14 thereof and extending to the rearward end 16, with sufficient clearance to provide for the closing of the tailgate 18 to its upright closed position.

The stowable ramp assembly includes a generally thin, flat and elongated ramp sleeve 20 which rests on the bed 12, a shorter extension sleeve 22 which is telescopically slidably received in the ramp sleeve, and an elongated rigid ramp 24 which is telescopically slidably movable through the extension sleeve and into and from the ramp sleeve for movement between the storage position of FIG. 3 and extended working position of FIG. 1.

Ramp sleeve 20, in the preferred embodiment, is an inverted generally U-shaped channel member including a load supporting top wall 26 having downturned side walls 28 and 30 which, in turn, have inwardly directed flanges 32 and 34 along the lower edges thereof. Front, middle and rear cross plates 36, 38 and 40 are rigidly connected to and extended between the flanges 32 and 34 for closing the periphery of the sleeve and structurally reinforcing the side walls. The ramp sleeve 20, as well as the extension sleeve 22 and ramp 24, are preferably of all galvanized construction so as to be rust free. Suitable dimensions for the ramp sleeve of the preferred embodiment include a 16¼ inch width, an 8-foot length and 3½ inch height. Accordingly, the ramp extends across the full 8-foot length of conventional pickup truck beds and three of the ramps will fit in side-by-side relation between the wheel wells in a pickup truck bed.

Figure 5:
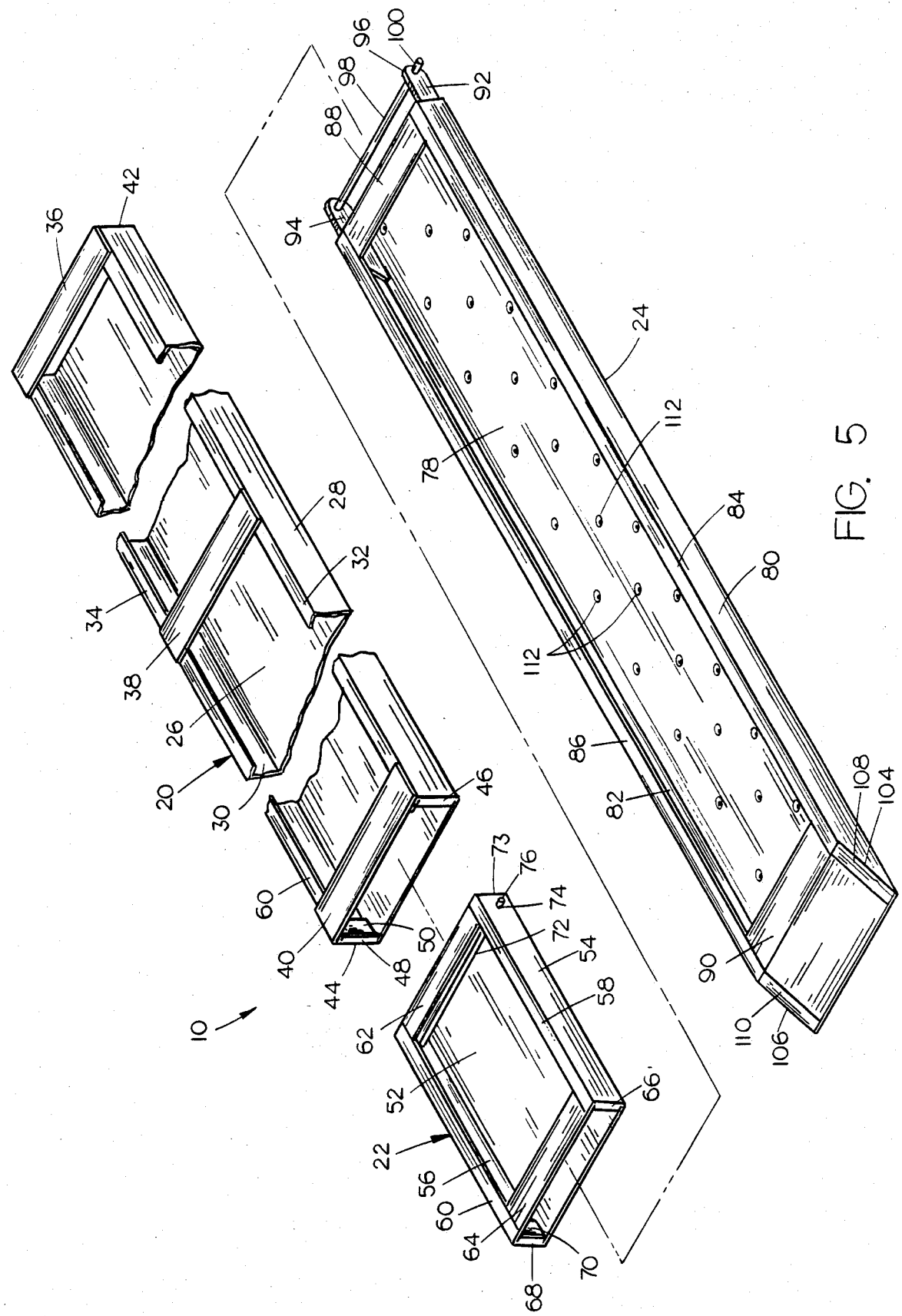
FIG. 5 is an exploded perspective view showing the underside of the ramp assembly.

In FIGS. 4 and 5, the forward end 42 of the ramp sleeve is shown to be open ended whereas the rearward end 44 is partially blocked by turned in end flanges 46 and 48. A pair of stop plates 50 are rigidly secured against the interior surface of side walls 28 and 30 at the rearward ends thereof for a purpose described below.

Extension sleeve 22 likewise comprises an inverted generally U-shaped channel member including a top wall 52 having downturned side walls 54 and 56 which, in turn, have inwardly directed flanges 58 and 60 along the lower edges thereof. A pair of front and rear cross plates 62 and 64 are rigidly connected to and extended between the flanges. These cross plates are preferably arranged coplanar with the flanges so as not to interfere with free sliding movement of the extension sleeve 22 within ramp sleeve 20. The rearward ends of side walls 54 and 56 likewise have turned in flanges 66 and 68 and a pair of stop plates 70 are rigidly secured against the interior surface of the side walls adjacent the rearward ends thereof.

To prevent rearward withdrawal of the extension sleeve 22 from the ramp sleeve, an elongated transverse rod 72 is extended through suitable openings 74 through the rearward ends of side walls 54 and 56 so that the opposite ends of the rod present outward projections 76 which abut against the stop plates 50 at the rearward end of the ramp sleeve 20 to limit rearward movement of the extension sleeve to the working position of FIG. 2. The length of the extension sleeve is preferably designed so that the rearward end 73 of the sleeve, in its fully extended working position, is vertically registered with the rearward end of the tailgate 18 as shown in FIG. 2.

The elongated ramp 24 is similarly constructed as an inverted U-shaped channel member including a top wall 78 having downturned side walls 80 and 82 within interiorly directed flanges 84 and 86 along the lower edges thereof. Front and rear cross plates 88 and 90 are preferably arranged coplanar with the flanges 84 and 86 so as not to interfere with free sliding movement of the ramp through the extension sleeve 22 and within the ramp sleeve 20.

At the forward end of the ramp 24, a pair of support plates 92 and 94 are secured against the interior surfaces of side walls 80 and 82 and extend rearwardly beyond the rearward end 96 of the ramp for receiving and supporting transverse rod 98 which is extended through holes in the support plates to present outward projections 100 which protrude outwardly from the ramp side walls 80 and 82. When the ramp is moved rearwardly, the projections or stubs 100 abut against the stop plates 70 in the extension sleeve to limit rearward pivotal movement of the ramp to the working position illustrated in FIG. 2.

The rearward ends of support plates 92 and 94 are preferably rounded and situated adjacent the rod 98. Furthermore, since the height of the support plates is less than the interior height of the extension sleeve, there is sufficient vertical play that the ramp is freely pivotable through an approximately 45° arc to accommodate placement of the rearward end of the ramp on surfaces both below ground level or above the tailgate 18.

The rearward end of side walls 80 and 82 are preferably tapered upwardly and rearwardly as at 104 and 106 within inwardly directed flanges 108 and 110 extended along the tapered edges to provide a skid surface for supporting the lowered end of the ramp on the ground or the like. This also allows the rearward end of top wall 78 to engage the ground to provide a smooth ramp end free of any obstructing raised edge.

For traction, the top wall 70 of the ramp may be formed with a pattern of raised dimples 112 as shown in the drawing. Longitudinal or transverse ribs may also be formed in the top wall for added traction. Similar traction mains may be provided in the top wall of the extension sleeve and ramp sleeve as well.

Whereas a preferred embodiment of the invention has been shown and described herein, many additions, modifications and substitutions may be made which are within the intended broad scope of the appended claims. For example, the extension sleeve may be of greater length than that shown in the drawings to further facilitate the transfer of loads from the extended end of the extension sleeve to the ramp sleeve and therefore to the truck bed. This is a safety feature which protects the tailgate and which increases the amount of load which can be safely moved up the ramp. Furthermore, a series of longitudinally spaced-apart holes may be provided in the side walls of the extension sleeve for longitudinal adjustment of rod 72 for adapting the extension sleeve for use with tailgates of different heights. Likewise, the various members could be formed as complete tubes although the open bottomed construction is preferred for weight reduction, cleaning, drainage and access.

In use, the relatively lightweight ramp assemblies can be easily lifted and placed onto the bed of a pickup truck. Generally two ramps assemblies will be provided in spaced-apart relation with either a deck filler plate or a third ramp assembly placed between them for providing a continuous flat top surface. The truck bed does not have to be altered in any way. During transport, the ramp and extension sleeve are stored within the ramp sleeve thereby allowing the tailgate to be raised to its closed position. For use of the ramp, it is an easy matter to lower the tailgate and then pull the ramp rearwardly. The engagement of the rod 98 of the ramp with the stop plates 70 on the extension sleeve effectively causes the extension sleeve to be pulled rearwardly with the ramp to its working position. The rearward end of the ramp is simply then lowered onto the ground or any other support surface. Note that sawhorses or the like could be placed under the ramp for providing an extended work surface. Likewise, the ramp can be partially inserted through the extension sleeve and into the ramp sleeve to serve as a bed extension for carrying long loads.

Thus there has been shown and described a stowable ramp assembly which accomplishes at least all of the stated objects.

I claim:

1. A stowable ramp assembly for a pickup truck or the like having an elongated bed and a tailgate pivotally movable between vertical and horizontal positions, comprising, a generally thin, flat and elongated ramp sleeve having forward and rearward ends, a load supporting top wall and a pair of opposite side walls, said ramp sleeve adapted for placement on a truck bed with the rearward end thereof positioned at the rearward end of the bed, an extension sleeve generally telescopically slidably received in said ramp sleeve for fore and aft sliding movement between a storage position at least substantially within said ramp sleeve and a working position extended rearwardly of the ramp sleeve by a dimension of approximately the rearward extent of the tailgate from the bed in the horizontal position thereof, said ramp sleeve and said extension sleeve each comprising an inverted generally U-shaped channel member, first coacting stop means on said ramp sleeve and extension sleeve operative to limit rearward sliding movement of the extension sleeve to the working position thereof, said first coacting stop means comprising an outward rod-like projection on each side wall of the extension sleeve adjacent the forward end thereof and a pair of registered stop plates on the interior surface of the ramp sleeve side walls adjacent the rearward ends thereof and at positions for abutment by said rod-like projections, an elongated ramp generally telescopically slidably received in said extension sleeve for fore and aft sliding movement through said extension sleeve and into and from said ramp sleeve between a storage position substantially entirely within said ramp sleeve and an extended working position with the forward end of the ramp situated adjacent the rearward end of the extension sleeve in the working position thereof, said ramp substantially as long as said ramp sleeve, second coacting stop means on said ramp and extension sleeve operative to limit rearward sliding movement of the ramp to the working position thereof, said second coacting stop means comprising an outward rod-like projection on each side wall of the ramp adjacent the forward end thereof and a pair of registered stop plates on the interior surface of the extension sleeve side walls adjacent the rearward ends thereof and at positions for abutment by said rod-like projections on the ramp, and the forward end of said ramp, in the extended working position thereof, being connected to said extension sleeve for up and down pivotal movement of the rearward end of the ramp.

2. The ramp assembly of claim 1 wherein said ramp sleeve comprises said inverted generally U-shaped channel member wherein said side walls are integral downturned side portions of the top wall and further comprise inwardly directed elongated flanges along the lower edges thereof.

3. The ramp assembly of claim 2 further comprising at least one cross member connected to and extended between the flanges on opposite side walls of the ramp sleeve.

4. The ramp assembly of claim 1 wherein said rod-like projections on the extension sleeve comprise the opposite ends of a rod extended transversely through both side walls thereof.

5. The ramp assembly of claim 1 wherein the transverse width of said ramp sleeve is between 6 and 24 inches whereby more than one ramp assembly may be placed in side-by-side relation on the truck bed.

* * * * *